US006577846B2

(12) United States Patent
Poor

(10) Patent No.: US 6,577,846 B2
(45) Date of Patent: Jun. 10, 2003

(54) METHODS FOR RANGE FINDING OF OPEN-ENDED ASSESSMENTS

(75) Inventor: David D. S. Poor, Meadowbrook, PA (US)

(73) Assignee: CTB-McGraw Hill, LLC, Monterey, CA (US)

( * ) Notice: Subject to any disclaimer, the term of this patent is extended or adjusted under 35 U.S.C. 154(b) by 203 days.

(21) Appl. No.: 09/781,334

(22) Filed: Feb. 12, 2001

(65) Prior Publication Data

US 2002/0110797 A1 Aug. 15, 2002

(51) Int. Cl.[7] .............................................. G09B 11/00
(52) U.S. Cl. .................... 434/353; 434/307 R; 434/350
(58) Field of Search ................................ 434/322, 323, 434/350, 353, 362, 356, 365, 307 R, 169

(56) References Cited

U.S. PATENT DOCUMENTS

| 4,958,284 A | * | 9/1990 | Bishop et al. ............... 434/353 |
| 5,437,554 A | * | 8/1995 | Clark et al. .................. 434/322 |
| 5,466,159 A | * | 11/1995 | Clark et al. .................. 434/322 |
| 5,672,060 A | * | 9/1997 | Poor ........................... 434/322 |
| 6,181,909 B1 | * | 1/2001 | Burstein et al. ............. 434/353 |
| 6,267,601 B1 | * | 7/2001 | Jongsma et al. ............. 434/323 |
| 6,356,864 B1 | * | 3/2002 | Foltz et al. ..................... 704/1 |
| 6,366,759 B1 | * | 4/2002 | Burstein et al. ............. 434/353 |

* cited by examiner

Primary Examiner—Joe H. Cheng
Assistant Examiner—Kathleen M Christman
(74) Attorney, Agent, or Firm—Rothwell, Figg, Ernst & Manbeck, P.C.

(57) ABSTRACT

The current invention discloses methods to expedite and simplify a range finding process with resulting savings in time and cost. The invention utilizes digitized representations of respondent answers instead of documents containing the student responses. The invention uses methods of using performance indicators other than the response itself to identify a targeted subset of individual student responses within the sample which are likely to be exemplars of any given score point. In the preferred implementation of this invention, scanned images or other digitized representations of the student responses, and electronically recorded performance indicators are used so that a computer system can quickly and efficiently identify and present the targeted subset to the expert readers of a range finding team. The invention allows expanding the sample of responses available to range finding, up to the entire test administration.

10 Claims, 2 Drawing Sheets

METHODS FOR RANGE FINDING OF OPEN-ENDED ASSESSMENTS

BACKGROUND OF THE INVENTION

1. Field of the Invention

This invention is related to the general field of academic assessment testing, and within that field to the task of selecting test taker responses appropriate to be exemplar responses for the score points in open-ended (non-objective) assessment items, commonly referred to as "range finding". Although the methods described herein may be useful in other related tasks, the most common application is likely to be range finding to provide exemplar responses for training the readers or scorers of the responses to the open-ended test items.

2. Description of Related Art

While multiple-choice and other objective assessment items have proven to be cost effective and generally accurate for many tests, open-ended or non-objective items are often specified for a variety of tests. Typically such open-ended items must be scored by human "readers"; that is, each response is read by one or more trained readers who assign appropriate scores to the response.

It is necessary to train multiple readers to give equivalent scores to assessment responses. Typically training is done by showing readers the rules under which the scores are given and sample responses representing all of the possible "score points". The rules are embodied in a "rubric", while the sample responses are included in "anchor sets", "training sets", and/or "qualifying sets" of items. So-called "anchor sets" typically consist of sample responses selected to represent an "exemplar" response for each score point. "Training sets" include exemplar responses selected to teach readers how to properly assign all possible scores. "Qualifying sets" consist of responses selected to verify that any reader can appropriately assign the proper score point to a student response after having been trained.

"Range finding" is a term that refers to selecting student responses appropriate to be the sample responses for training and related materials including, but not limited to, anchor sets, training sets, and qualifying sets. The term "range finding" reflects the fact that exemplar responses must be located or "found" representing the full range of scores. Range finding is typically performed on a sampling of unscored student responses. Often the sample of unscored materials is a subset of student responses "pulled" from a live administration of a test. In some cases the sample will be from a smaller "field test" administration designed to check the test before it is put into operational status.

When items are scored as credit/no credit (or other dichotomous scoring), exemplar samples can generally be found quickly. Many open-ended items, however, are scored on scales, typically with 4 to 6 score points. This significantly complicates the range finding since exemplar samples must be found for all points. In addition, many tests are designed to identify students that meet high standards, a result of which may be that high-end exemplars may be rare or even non-existent within the particular sample of student responses being examined.

Range finding has been traditionally performed by a team of content experts and scoring specialists working together with the paper responses. Members of the team go through unscored test materials looking for sample responses representing each score point. When one member "finds" what he or she believes to be an appropriate student response for a particular score point, at least one other member of the team confirms the score point for that response. This process can be tedious. Often the sample of papers consists of student responses clustered around one or two score points so that team members spend the bulk of their time looking at samples of the same score points again and again. As a result, they often resort to quickly glancing at responses "looking" for papers that might be examples of the higher score points. Sometimes they need to go through each and every student response in the sample, and even then may not find enough samples of each score point for training and qualifying readers.

The problem of scarce high score points is well known, and methods have been found methods to alleviate the problem. When large test administrations are the source of the sample of students, administrators will pick some student responses from traditionally high scoring schools or classrooms of honors students to include in the sample. When the sample is based on a field test, administrators will try to recruit participation by at least one or more high performing schools.

In assessment testing, answer documents may contain both pages that are processed by Optical Mark Reading (OMR), and separate pages that contain responses (or answers) to open-ended assessments, such as hand-written essays or other responses that can have a range of score points. When completed test documents are received for the scoring process, they are prepared for optical scanning and processed by an Optical Mark Scanner. In the scanning progress, the pages with OMR responses are processed and separated from the pages with open-ended responses. The pages with open-ended responses are divided into "packets" of materials to be read and scored. These packets are passed on to trained readers so that the open-ended responses can be scored.

When range finding is required to locate exemplar responses for the range of score points, some documents are diverted from the normal processing and become the sample of documents that are reviewed for range finding. When entire test documents are used for range finding, some documents are diverted to the range finding process prior to scanning and are examined by the range finding team. The responses selected as score point exemplars are then typically photocopied, and the copies are used for training materials. Once they have been reviewed for the range finding process, the diverted documents are put back into the production process for scanning.

The range finding is also sometimes done by diverting just a sample of pages with open-ended responses, rather than the entire test document. After scanning the test document, some pages containing open-ended responses are diverted to the range finding team for review as exemplars of score points. Again, the responses selected as exemplars are typically copied and the copies are used for training. Once they have been through the range finding process, the diverted sheets are put into packets and the packets are forwarded to readers for scoring.

When the entire test documents are large, the process of diverting only the open-ended response pages has the advantage of providing the range finding team with less paper. However, because the sheets containing student identification are typically separated during the scanning process, it would be difficult to locate student responses from students in specific schools or to locate responses from specific students, if it were desired to use that information to target sets of responses to examine for particular score points.

SUMMARY OF THE INVENTION

The current invention consists of methods to expedite and simplify the range finding process. First, the invention utilizes digitized representations, such as scanned images, of test taker answers to review for exemplars of score points, rather than review of the paper documents containing the student answers. Secondly, the invention uses a method of identifying targeted subsets of individual student answers which are likely to be exemplary of any given score point. In the preferred implementation of this invention, digital representations of the answers are linked to the student identity and some student performance indicator so that a computer system can determine a targeted subset. Alternatively, the digital representations could be linked to a performance indicator without utilization of the student identity. The invention also allows for expanding the sample of answers available to range finding, storing evaluation data, and sequencing answers.

Use of Digitized Representation of Open-Ended Responses

Range finding is significantly enhanced by the use of digitized representations of student responses. The most common of such digital representation is an optically scanned image of a student's written response, although the digitized images could be created by keyed input, OCR, voice recognition or similar interface. In this environment, the reader-team members examine the digitized representation of the open-ended responses on computer screens rather than going through hundreds or thousands of student responses on paper. Scores assigned by readers are immediately recorded and saved within the computer system. The benefits of using digitized representation of open-ended responses for range finding parallel the significant benefits of using digitized representations of open-ended responses for scoring, as shown in U.S. Pat. No. 5,672,060 (Poor).

Use of Targeted Subset of Sample

Range finding generally starts with a thorough review of the scoring rubric and then an examination of a random or arbitrarily selected subset of responses from the sample. This examination may be done individually or as a group and generally leads to identification of samples of some score points. As the process continues, more student responses are given scores. At some time, there are sufficient sample responses for some score points (generally the middle or lower points within the scale), but not for others (generally the higher score points, but sometimes also the lowest). From this situation, range finding can be made much more efficient by providing the team subsets of the sample which are more likely to contain the score points which are under represented.

It is known that different academic assessments and other indicators of student performance are often highly correlated. The task of finding examples of specific score points, then, can be reduced by providing the team members with subsets of the sample which represent individual students who have shown, for example, high scores on a related assessment or other academic performance data.

Using traditional paper techniques, this can be done by providing the expert reader team with reports ranking student performance for all students in the sample. Members could then find any given student's response by looking for that student's document within the appropriate test administration group of documents (often the student's school and classroom). In seeking responses to review for exemplars of the highest score point, for example, the reader team could select responses from student's with a high academic performance in the ranking.

Using on-screen presentation of the student responses, however, there are at least four methods whereby expert readers can examine targeted subsets of responses from the sample:

- readers can be presented with a subset of sample responses selected on a range of performance of students in the sample on an appropriate academic performance indicator;
- readers can be presented with student responses that are ordered or ranked by the student scores on a selected academic indicator;
- readers can be presented with a subset of sample responses presented for evaluation ordered or ranked by the student scores on an academic indicator which includes only those students whose scores fell within a specified range of scores;
- readers can be presented with a specific student's response where that student has previously been identified based on performance on a related item or items.

Any of these methods can greatly expedite range finding, and this list is not intended to be exhaustive of such methods. Each of these methods of targeted examination of student responses significantly improves the likelihood of finding exemplars of needed score points and thereby significantly reduces the time, effort, and cost of range finding.

Academic Performance Indicators:

Although other indicators of student performance can be used, the following indicators of academic performance are often available at little or no cost and can be used individually or in combination:

- Score on objective test items, such as multiple choice items: With an increasing number of assessments including both multiple-choice and open-ended assessment items, the scores on the multiple-choice items can be used to rate student performance on each section of the test. These scores can then appropriately be used to target selection of open-ended items within each section.
- Score on other assessment: Using standard computer techniques, student scores from earlier assessments can be matched to each student's current assessment. These scores can then appropriately be used to target selection of related open-ended items within the assessment.
- Course performance: Student grades in current or prior courses can be used. Such grades can be matched to the student using standard computer techniques, or the grades can be entered directly onto the student answer document. These grades can then be used to target selection of related open-ended items within the assessment.
- Teacher performance rating: Teachers can be asked to indicate the relative performance rating of each student on each section within the assessment. Such ratings can be inexpensively collected directly on the student response document. These ratings can then be used to target selection of related open-ended items within the assessment.
- Student performance rating: Students can be asked to rate their own performance, on specific open-ended assessment items or on sections within the assessment. Such ratings can be inexpensively collected directly on the student response document. These ratings can then be used to target selection of related open-ended items within the assessment.

This list is not intended to be exhaustive of the indicators which may be used to predict whether the response is more likely to be graded within a limited range of score points for the assessment than the response of other test takers.

Expanding the Sample Available for Range Finding

In most assessments, students complete their responses on specially designed answer documents suitable for processing by Optical Mark Reading (OMR). In traditional paper techniques, the range finding is performed before student answer documents are scanned or after the documents are scanned and before they are sent for scoring. Often, the sample for range finding is diverted to the team doing range finding while the balance of the answer documents go through normal production processing. As a result, it is extremely difficult to get additional student responses to the team if the original sample is not sufficient.

By using the digitized representation of student responses, all documents go through the same process: a single scanning process is used to capture both the OMR data (identifying information and multiple-choice items) and the images of the student responses to open-ended responses. The original sample for the range finding team is processed first so that range finding can begin as soon as possible. While the range finding team is conducting range finding, however, additional documents are being scanned and therefore become available for range finding. If necessary to find enough of the needed exemplars, the range finding team can complete its task having responses from most or all of the students tested.

DETAILED EXPLANATION OF PREFERRED EMBODIMENTS OF THE INVENTION

Figure 1:
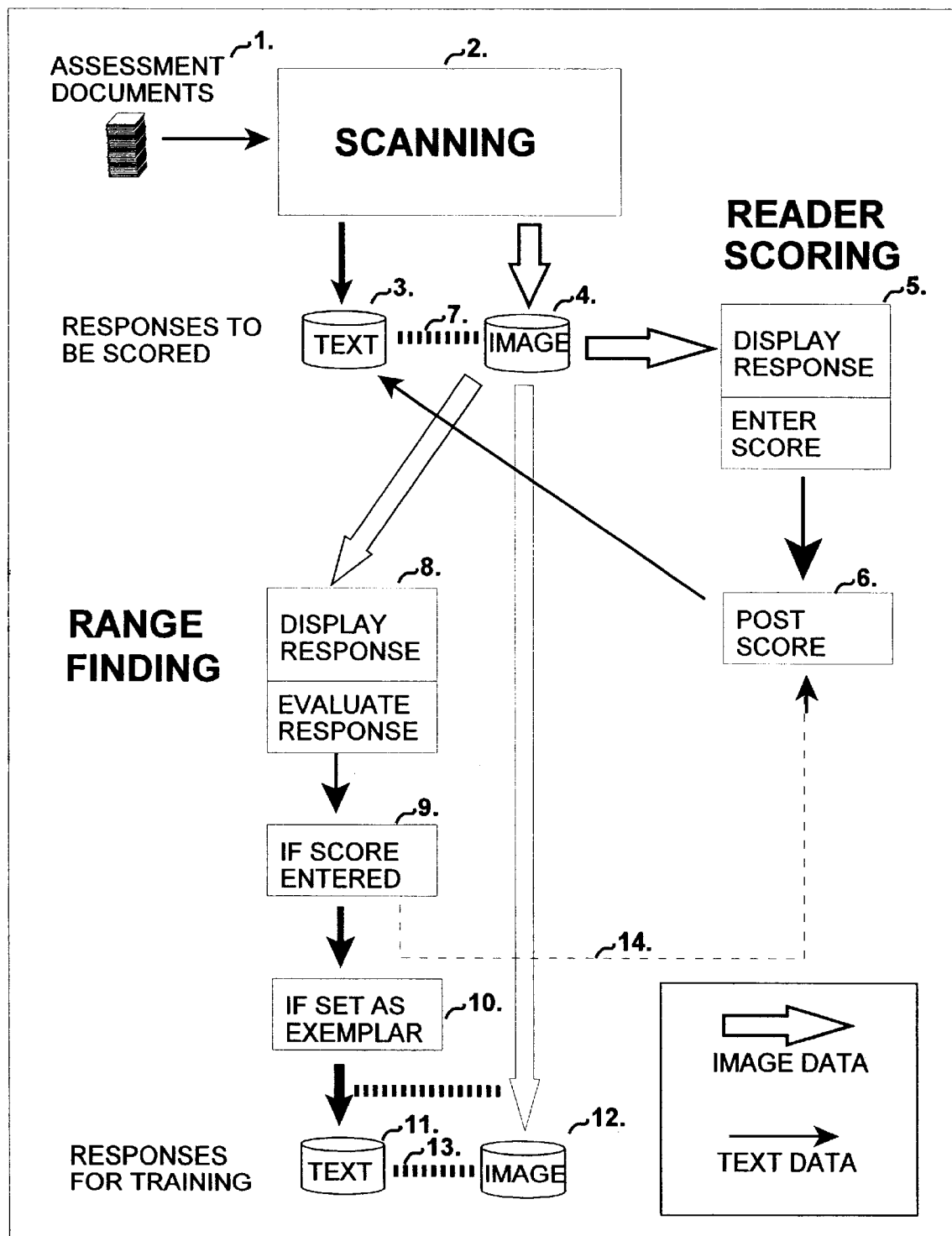
FIG. 1 is a schematic chart which shows steps of using digital representations of test taker's responses to open ended assessments, such as scanned images of hand-written responses, for range finding and scoring.

In contrast to range finding with paper documents, the present invention uses digitized representations of the responses to open ended test items. Referring now to FIG. 1, the answer documents or test books contain sections that are processed by Optical Mark Reading (OMR) for test takers to record their identification information and answers to objective or multiple choice questions, and separate sections or areas for students to record their responses to the open-ended assessments. These sections can be intermixed, even within the same page. When completed test documents (1) are received, they are processed by a scanner capable of both reading both the OMR responses and capturing the images of the open-ended responses. In this scanning process (2), all the pages of a document are kept together, and can be placed back into boxes or other appropriate storage containers immediately after scanning.

While the electronic output from some traditional scanning includes only the OMR data, the electronic output from this scanning (2) includes text-based files containing the text based OMR data (3) and images of the open-ended responses (4). Typically the text-based electronic data file will include student identification, multiple choice items, and other identifying information such as the school district, the school, the classroom, information tracking the processing. In addition to the text based data, image data will be saved as digitized representations of the student responses to open-ended items containing at least the areas on the form designated for such use, and stored in electronic form in an image file. The images can then be displayed on screen to readers for scoring (5) and scores entered based on the displayed images can be posted to the text based data (6). Such process is described in U.S. Pat. No. 5,672,060 (Poor).

The scanning system or storage system must ensure that there is appropriate linkage (7) between the text-based information and the image data so that the digitized representations of any given student's responses are associated with the student and can be retrieved for the student. As shown in U.S. Pat. No. 5,672,060 (Poor), the text-based data may be stored in a "scanned data file" and transferred to an "Assessment Scoring File" while the images are stored in a separate "Imagebase" file. These data, however, may alternatively be stored in a common database, in multiple electronic files, or other configurations.

In accordance with this invention, range finding activities may performed under control of a software system which is also used for scoring images of open-ended responses, such as the "ScoreImage™" software system used by Uniscore, Inc. Referring again to FIG. 1, after the responses have been scanned and the text and image files created, a test taker response is selected to be displayed for range finding. In normal scoring applications, the ScoreImage™ system automatically selects the responses to be displayed to an expert reader and brings the images up on a display screen (8). The reader then evaluates the response as a possible exemplar of a score point.

Unlike regular readers who must score or code each response presented to them, members of range finding teams may or may not choose a specific student response as an exemplar for inclusion in the training and related materials. If a specific response is selected, the team member records an appropriate score and/or code for the response being displayed, such as by keyboard or mouse input. As with regular readers, expert readers may enter codes to designate why a given response has no score and can include such codes as "E" to designate that the response is not written in English, "S" to designate that the response is to short to score, and "I" to designate that the writing is illegible. The team member can also enter an "annotation" or brief explanation concerning the score or code given. These explanations and codes are evaluation data.

If the expert reader assigns a score point to the response (9), that item becomes eligible for selection as an exemplar for that score point. If the expert reader further selects the response to be a score point exemplar for training (10), the image of the response is electronically stored in a set of images to be used for training and qualifying readers (11), and the score point for which the response is an exemplar and any other appropriate evaluation data are stored in a text file (12). The software system then links the image of the response to the score point it represents (13). In this manner, the expert reader conducts range finding with digitized representations of responses rather than with paper documents.

For all the responses scored by the expert reader, including those not selected as exemplars for the score point, the assigned score can be electronically recorded (14) in the manner described in U.S. Pat. No. 5,672,060 (Poor). Thus, the range finding process may also result in a first scoring of the sample reviewed for range finding.

If adequate exemplars are not found, additional responses can be examined from students whose responses were captured after range finding started.

Figure 2:
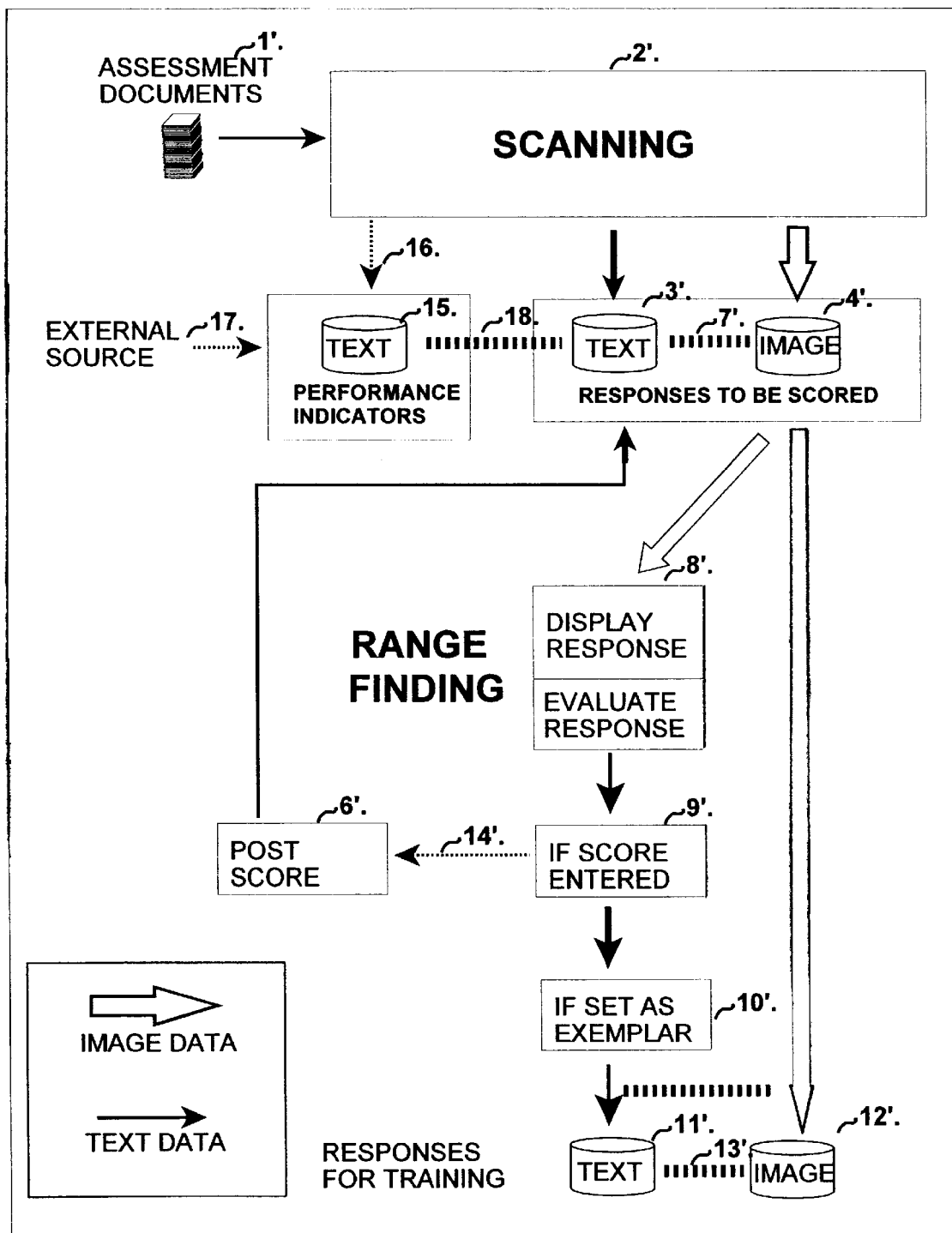
FIG. 2 is a schematic chart which shows steps of using one or more performance indicators (other than the response itself), as a predictor of whether the test taker's response is likely to correspond to a limited range of score points for the purposes of expediting range-finding.

FIG. 2 discloses a technique that significantly expedites the range finding with digital representations of FIG. 1. Several criteria can be used to make a targeted selection of responses to review for specific score points that are predicted as likely to be graded within a limited range of score points.

First, a text file (15) is created that contains data related to performance indicator(s) on which criteria for selection can be based. The performance indicator data can either be derived directly from scanned performance data (16), or the performance indicator data can be extracted and input from an external source (17). For all or some students whose responses have been scanned, the appropriate performance indicator data are linked to the scanned text based data (18). The data in the two text files can be combined into one in order to establish the linkage. Once the type of performance data is selected and a range or level of performance is selected as the performance indicator, the system can create a set of responses limited to students whose performance fall within the performance indicator range. Also, when a student performance indicator is specified, the system can order the students by ascending or descending scores on the performance indicator data.

For example, if the performance selected data is the test talker's score on multiple-choice items in the same assessment, as derived by OMR and stored in a text file, the performance indicator can be that scores within a certain range are likely to correspond with a range of score points for the open-ended assessment. Thus, the range finding team may decide that a performance indicator of 90 to 100 correct on the multiple-choice items is likely to predict a score point of 5 to 6 on a six-point non-objective assessment.

Once the set of available students has been determined, the system can present the expert reader with the list of students from which to select responses for evaluation, or the system can automatically select responses to be evaluated.

Once a response is selected, it is then displayed (8) on an expert reader's computer screen using the same procedures used to display images to readers for scoring.

If adequate exemplars are not found in the targeted set an additional set can be selected from students whose responses were captured after selection of the initial set using the same criteria.

In order to prepare for training, responses stored for training (11, 12, 11', 12') may be typically categorized into several mutually exclusive sets which may include "anchor sets", "training sets", and "qualifying sets" and other special designations. Anchor sets are printed and presented to new readers as hard-copy and are also available for reference on screen. For these, and any others deemed appropriate, the system can produce printed versions of the digitized student responses including selected text data (e.g. scores, annotations) stored in the text data file (11, 11'), for inclusion in reader training materials.

Although the invention has been described and shown with respect to the exemplary embodiment thereof, it should be understood by those skilled in the art that the foregoing and various other changes, omissions and additions may be made therein and thereto, without parting from the spirit and scope of the present invention. In particular, although most of the foregoing description described the invention in terms of student responses, it would be recognized by those skilled in the art that this invention could be used for respondent answers outside of an academic environment.

I claim:

1. A method of presenting to an expert reader a digitized representation of a test taker's response to an open-ended assessment for the purpose of enabling the reader to identify exemplar responses for range finding, the method comprising the steps of:

(a) electronically recording a digitized representation of the test taker's response to the open-ended assessment;

(b) identifying an indicator other than the response as a predictor of whether the representation is likely to be graded within a limited range of score points for the assessment;

(c) linking data related to the indicator to the digital representation of the response;

(d) selecting the response for display to the expert reader only if the indicator is associated with the response; and (e) electronically displaying the digitized representation to an expert reader for evaluation as a possible exemplar response.

2. The method of claim 1, in the event that the expert reader evaluates the digitized representation to be an exemplar response, comprising the further steps of:

(f) electronically recording the representation in a set of digital representations of responses for training readers;

(g) recording a score point for which the representation is an exemplar; and (h) linking the score point to the recorded representation.

3. A method of presenting to an expert reader a digitized representation of a test taker's response to an open-ended assessment for the purpose of enabling the reader to identify exemplar responses for range finding, the method comprising the steps of:

(a) electronically recording a digitized representation of the test taker's response to the open-ended assessment;

(b) identifying an indicator other than the response as a predictor of the likely range of score points in which the response will be graded;

(c) linking data related to the indicator to the digital representation of the response;

(d) sequencing the digital representation for display to the reader in an order of representations based upon its relative ranking to other representations with respect to the indicator; and (e) electronically displaying the digitized representations to an expert reader for evaluation as a possible exemplar response in the sequence as determined.

4. The method of claim 3, in the event that the expert reader evaluates the digitized representation to be an exemplar response, comprising the further steps of:

(f) electronically recording the representation in a set of digital representations of responses for training readers;

(g) recording a score point for which the representation is an exemplar; and (h) linking the score point to the recorded representation.

5. A method of presenting to an expert reader a set of digitized representations of respondent answers to an open ended assessment for range finding, the set being targeted to identifying exemplars of answers within a limited range of score points in the assessment, the method comprising the steps of:

(a) electronically recording a digitized representation of the response of each of a plurality test takers of the open-ended assessment;

(b) selecting a performance indicator for test takers, other than the response, as a predictor of whether a response is likely to be graded within the limited range of score points;

(c) for each of such plurality of test takers, electronically recording data related to his or her performance relative to the performance indicator;

(d) for each of such plurality test takers, linking the test taker's performance indicator data with the representation of his or her response;

(e) identifying by the performance indicator those responses that are likely to be graded within the limited range of score points;

(f) creating a set of responses from those identified as likely to be graded within the limited range of score points; and (g) electronically displaying images from the set to the expert reader for evaluation as a possible exemplar response.

6. A method as in claim 5, wherein the indicator is derived from data from the group consisting of:

score on answers to objective test items in the same assessment, score on other assessments; school attended, school placement section, academic performance, teacher performance rating; and student performance rating.

7. A method as in claim 5, wherein the indicator is whether the test taker's score on answers to objective test items in the same assessment is within a selected range of scores.

8. A method as in claim 7, wherein the digitized representation is a scanned image of response and the test taker's score on answers to objective test items is determined by OMR.

9. A method as in claim 5, wherein the representations are displayed from the set in a sequence ranked by the indicator.

10. A method as in claim 5, wherein if the expert reader evaluates the digitized representation to be an exemplar response, comprising the further steps of:

(c) electronically recording the representation in a set of digital representations of responses for training readers;

(d) recording a score point for which the representation is an exemplar;

(e) linking the score point to the recorded representation.

* * * * *